US012762602B2

(12) United States Patent
Crabtree

(10) Patent No.: US 12,762,602 B2
(45) Date of Patent: Oct. 13, 2026

(54) SYSTEM AND METHOD FOR A BETTER FITTING WEARABLE ITEM

(71) Applicant: PrecisionFit Technologies, LLC, Miami, FL (US)

(72) Inventor: John Granville Crabtree, Key Biscayne, FL (US)

(73) Assignee: PrecisionFit Technologies, LLC, Key Biscayne, FL (US)

( * ) Notice: Subject to any disclaimer, the term of this patent is extended or adjusted under 35 U.S.C. 154(b) by 49 days.

(21) Appl. No.: 18/779,487

(22) Filed: Jul. 22, 2024

(65) Prior Publication Data

US 2024/0378657 A1 Nov. 14, 2024

Related U.S. Application Data

(63) Continuation of application No. 18/172,623, filed on Feb. 22, 2023, now Pat. No. 12,067,608, which is a
(Continued)

(51) Int. Cl.
*G06Q 30/00* (2023.01)
*G06F 16/9535* (2019.01)
(Continued)

(52) U.S. Cl.
CPC ..... *G06Q 30/0631* (2013.01); *G06F 16/9535* (2019.01); *G06Q 30/0201* (2013.01); *G06Q 30/0282* (2013.01)

(58) Field of Classification Search
None
See application file for complete search history.

(56) References Cited

U.S. PATENT DOCUMENTS 8,005,558 B2 * 8/2011 Waatti .................... B33Y 50/00 700/98
8,918,938 B2 12/2014 Osiol
(Continued)

FOREIGN PATENT DOCUMENTS

EP 1072989 A2 1/2001

OTHER PUBLICATIONS

3D Shoes, Accessed Online on Jan. 11, 2019: https://3dshoes.com.
(Continued)

*Primary Examiner* — Mila Airapetian
(74) *Attorney, Agent, or Firm* — MLO, a professional corp.

(57) ABSTRACT

A method includes a processor receiving consumer first data from a consumer device. The processor receives second data associated with a wearable item mold or the wearable item design that correlates to the wearable item from a plurality of wearable item source devices. The processor determines a plurality of matches by comparing a first virtual 3D model associated with consumer first data to a second virtual 3D model associated with the second data, and recommends the plurality of matches to the consumer device. The processor grants the plurality of wearable item source devices access to the consumer first data. A wearable item source associated with the wearable item source device is configured to modify a solid form of the wearable item mold in an assembly process or a wearable item design for the solid form of the wearable item mold in the assembly process, based on the consumer first data.

20 Claims, 7 Drawing Sheets

Related U.S. Application Data continuation of application No. 17/449,379, filed on Sep. 29, 2021, now Pat. No. 11,610,251, which is a continuation of application No. 16/836,322, filed on Mar. 31, 2020, now Pat. No. 11,164,237.

(60) Provisional application No. 62/835,187, filed on Apr. 17, 2019.

(51) Int. Cl.
*G06Q 30/0201* (2023.01)
*G06Q 30/0282* (2023.01)
*G06Q 30/0601* (2023.01)

(56) References Cited

U.S. PATENT DOCUMENTS

| | | | | |
|---|---|---|---|---|
| 9,460,557 | B1 | 10/2016 | Tran et al. | |
| 9,996,981 | B1 * | 6/2018 | Tran | H04N 5/272 |
| 10,299,722 | B1 | 5/2019 | Tran et al. | |
| 10,366,524 | B2 | 7/2019 | Andon | |
| 2001/0020222 | A1 | 9/2001 | Lee et al. | |
| 2005/0071935 | A1 | 4/2005 | Shah et al. | |
| 2007/0011173 | A1 | 1/2007 | Agostino | |
| 2007/0033750 | A1 * | 2/2007 | Cook | A43D 3/1458 12/133 R |
| 2010/0299616 | A1 | 11/2010 | Chen et al. | |
| 2011/0055053 | A1 | 3/2011 | Rutschmann | |
| 2012/0316985 | A1 | 12/2012 | Wilkinson et al. | |
| 2013/0191240 | A1 * | 7/2013 | Lasry | A43D 63/00 705/26.5 |
| 2014/0180866 | A1 | 6/2014 | Gonzales | |
| 2015/0081076 | A1 | 3/2015 | Fernandes | |
| 2015/0324490 | A1 | 11/2015 | Page | |
| 2016/0081435 | A1 | 3/2016 | Marks | |
| 2016/0107391 | A1 | 4/2016 | Parish et al. | |
| 2017/0053335 | A1 * | 2/2017 | Hanscom | A43D 1/027 |
| 2017/0169492 | A1 * | 6/2017 | Reggiardo, III | G06Q 30/0621 |
| 2017/0280828 | A1 * | 10/2017 | Berger | A43D 3/00 |
| 2017/0308945 | A1 * | 10/2017 | Loveder | G06Q 30/0621 |
| 2018/0082348 | A1 | 3/2018 | Banerjee et al. | |
| 2018/0110290 | A1 | 4/2018 | Cook et al. | |
| 2018/0317610 | A1 | 11/2018 | Golub | |
| 2019/0034996 | A1 | 1/2019 | Golub | |
| 2019/0037971 | A1 * | 2/2019 | Carlucci | A43D 119/00 |
| 2019/0188784 | A1 | 6/2019 | Bleicher et al. | |
| 2019/0228448 | A1 | 7/2019 | Bleicher et al. | |
| 2019/0347703 | A1 | 11/2019 | Bleicher et al. | |
| 2024/0188688 | A1 | 6/2024 | Lee et al. | |
| 2024/0394767 | A1 | 11/2024 | Lu | |

OTHER PUBLICATIONS

About Face ID advanced technology, Apple Support, 3 pages, Accessed Online on Jan. 11, 2019, https://support.apple.com/en-us/HT208108.

Anggoro et al., Computer-aided reverse engineering system in the design and production of orthotic insole shoes for patients with diabetes, Cogent Engineering, vol. 5, Issue 1, May 21, 2018, 20 pages, Accessed Online on Jan. 11, 2019 https://www.cogentoa.com/article/10.1080/23311916.2018.1470916.

Anson, Delivery, Soley Original, Apr. 17, 2018, Accessed Online on Jan. 11, 2019: https://solelyoriginal.com/blog/index.php/2018/04/17/delivering-bespoke-shoes-the-solely-original-journey/.

Chen and Zhang, Shoe Last Free-Form Surface Reconstruction Technique Based on Reverse Engineering, In: Lin S., Huang X. (eds) Advanced Research on Computer Education, Simulation and Modeling, CESM 2011. Communications in Computer and Information Science, vol. 176, pp. 396-402, Accessed Online on Jan. 11, 2019: https://link.springer.com/chapter/10.1007%2F978-3-642-21802-6_64.

Fitstation, HP Development Company, L.P, copyright 2019, 9 pages, Accessed Online on Jan. 11, 2019: https://www.fitstation.com.

Frequently Asked Questions, MTailor, Accessed Online On Jan. 11, 2020, https://www.mtailor.com/faq.

Fusion 360 reverse engineering. Shoe last redesign, YouTube Video, ThinkScan3D, Sep. 9, 2017, Accessed Online on Jan. 11, 2019, https://www.youtube.com/watch?v=tCtOdGtUQvg.

Geomagic Reverse Engineering Software and 3D Printing Reinvents Footwear Manufacturing , 3D Systems, Accessed Online on Jan. 1, 2019, https://www.3dsystems.com/customer-stories/timberland-uses-geomagic-reverse-engineering-software-and-3d-printing-reinvent.

How Handcrafters Adopt 3D Printing to Produce Custom Shoes, CAD Exchanger, Accessed Online on Jan. 11, 2019: https://cadexchanger.com/customers/135-3d-printers-in-footwear-industry.

How It Works, Soley Original, Accessed Online on Jan. 11, 2019: https://solelyoriginal.com/index.php/How-It-Works/.

How to 3D Print a Shoe Last, The Sneaker Factory, Mar. 1, 2015, Accessed Online on Jan. 11, 2019, https://sneakerfactory.net/sneakers/2015/03/how-to-3d-print-a-shoe-last/.

International Search Report dated Jul. 9, 2020 for PCT Patent Application No. PCT/IB2020/053062.

Notice of Allowance and Fees dated Apr. 24, 2024 for U.S. Appl. No. 18/172,623.

Notice of Allowance and Fees dated Nov. 17, 2022 for U.S. Appl. No. 17/449,379.

Notice of Allowance and Fees dated Sep. 22, 2021 for U.S. Appl. No. 16/836,322.

Office Action dated Jun. 18, 2021 for U.S. Appl. No. 16/836,322.

Office Action dated Sep. 20, 2023 for U.S. Appl. No. 18/172,623.

PrecisionFit: The secret to stylish, comfortable shoes, Soley Original, Accessed Online on Jan. 11, 2019: https://solelyoriginal.com/index.php/comfortable-shoes/.

Rout et al., 3D foot scan to custom shoe last, Special Issue of IJCCT vol. 1, Issue 2, 3, 4; 2010 for International Conference, Aug. 3-5, 2010, pp. 14-18, https://www.researchgate.net/publication/228879419_3D_foot_scan_to_custom_shoe_last.

Shoe last reverse engineering from 3D scan data, YouTube Video, ThinkScan3D, Jun. 4, 2017, Accessed Online on Jan. 11, 2019, https://www.youtube.com/watch?v=IhRRe7IKvrw.

* cited by examiner

SYSTEM AND METHOD FOR A BETTER FITTING WEARABLE ITEM

RELATED APPLICATIONS

This application is a continuation of U.S. patent application Ser. No. 18/172,623 filed on Feb. 22, 2023, which is a continuation of U.S. patent application Ser. No. 17/449,379 filed on Sep. 29, 2021, now U.S. Pat. No. 11,610,251, which is a continuation of U.S. patent application Ser. No. 16/836,322 filed on Mar. 31, 2020, now U.S. Pat. No. 11,164,237, which claims priority to U.S. Provisional Patent Application No. 62/835,187 filed on Apr. 17, 2019; all of which are hereby incorporated by reference in full.

BACKGROUND

Online shopping for various items is popular and convenient. Consumers purchase many types of items through online shopping. When the item is wearable in nature, it may be a challenge to decide what size to order for a proper fit. The consumer must rely on the given information such as typical sizing charts, without the luxury of trying on the item. If the item doesn't fit, the consumer may be disappointed and inconvenienced by the hassle of returning the item. For example, in the footwear market, most consumers have experienced ill-fitting shoes even though the consumer ordered the correct size based on the provided sizing charts.

It is known, for example, in the footwear industry that shoes may not fit perfectly or consistently between brands or even within brands. When a consumer purchases shoes, the only fit customization is based on the international standard Brannock Device of the x-y sizing axis of length, width and arch length which has been in practice since 1925. A proper, good fitting shoe may impact many factors such as comfort, performance, and durability. In the online retail world, a good fitting shoe drives customer satisfaction and increases the likelihood of repeat purchases while an ill-fitting shoe not only does the opposite, but it increases cost due to returns.

Custom-made shoes, or bespoke shoes, provide great or even "perfect" fitting shoes but the process is expensive, tedious and time consuming for both the consumer and manufacturer. This holds true of other custom-made wearable items such as dress shirts, suits or dresses. For example, the consumer may make several in-person visits to a store so that specific data with regard to the feet can be obtained from the consumer and tweaked. In other examples, consumers may obtain the foot data at home by taking their own measurements then sending the data to a company to make the custom shoe. This may involve answering a series of questions or providing casts or molds of their feet with kits. These methods are discouraging because they are vulnerable to user error, take time and expense to create and send the information, and impose inconvenience on the consumer who must master how to do the process by perhaps watching a video or studying instructions. The consumer may also lose interest in the purchase, and be inconvenienced with the time and expense to return the information, and frustrated by the time and expense to convert the information into shoes.

SUMMARY

A method is disclosed that includes a processor receiving consumer first data from a consumer device. The processor receives second data associated with a wearable item mold or the wearable item design that correlates to the wearable item of a plurality of wearable items from a plurality of wearable item source devices. The processor determines a plurality of matches by comparing a first virtual three-dimensional (3D) model associated with consumer first data to a second virtual 3D model associated with the second data, and recommends the plurality of matches to the consumer device. The processor grants the plurality of wearable item source devices access to the consumer first data. A wearable item source associated with the wearable item source device of the plurality of wearable item source devices is configured to modify a solid form of the wearable item mold in an assembly process or a wearable item design for the solid form of the wearable item mold in the assembly process, based on the consumer first data.

A method is disclosed that includes the processor recommending a plurality of matches to a consumer device, determined by comparing a first virtual three-dimensional (3D) model associated with consumer first data received from a consumer device to a second virtual 3D model associated with the second data received from a plurality of wearable item source devices. The processor grants the plurality of wearable item source devices access to the consumer first data. A wearable item source associated with the wearable item source device of the plurality of wearable item source devices is configured to modify a solid form of the wearable item mold in an assembly process or a wearable item design for the solid form of the wearable item mold in the assembly process, based on the consumer first data.

DETAILED DESCRIPTION

Figure 1:
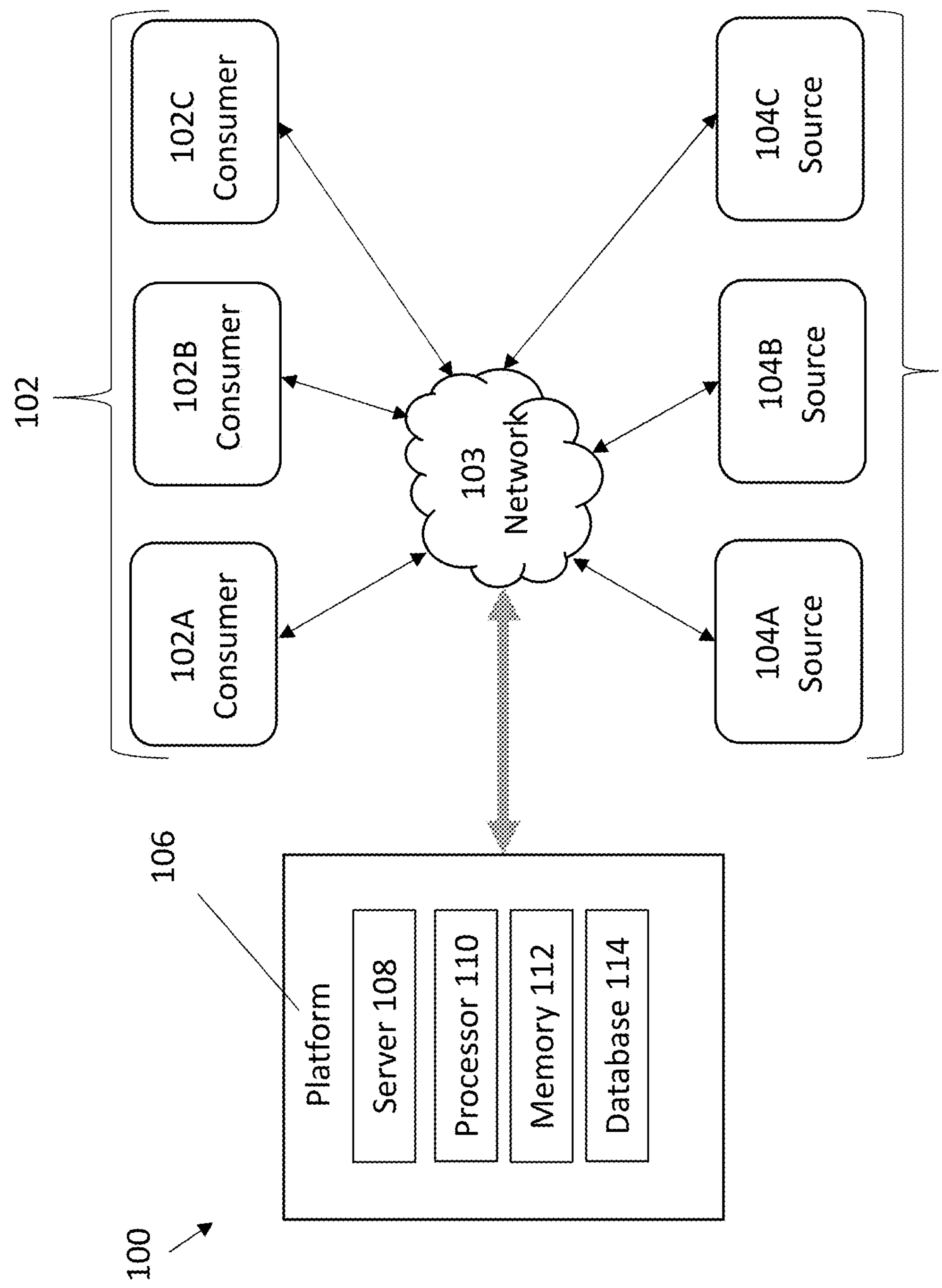
FIG. 1 is a simplified schematic of an example environment for the method or system, in accordance with some embodiments.

Disclosed herein is a system and method for the creation of a two-sided market in which both sides such as a consumer and a source (e.g., manufacturer) are incentivized to exchange their data through a data processing platform that serves as the middle layer for the market. This leverages game theory to incentivize a plurality of manufacturers to participate, wherein at least two manufacturers are different, separate, and unrelated business entities producing different brands of a product. For example, if only one manufacturer participated, the consumers are only offered a closed-loop service and those consumers cannot comparison shop among different brands due to that closed-loop. Accordingly, the system and method herein is for a better fitting wearable item such as footwear. The system and method may be applied to other markets such as headwear, baseball gloves, helmets, shirts, pants, dresses or other wearable items.

The system and method are beneficial to both consumers and manufacturers (or a representative thereof). A plurality of consumers share their biometric data, or precise data measurements of a body part such as their feet, and manufacturers share precise data measurements of the mold, last, pattern or design used to produce the item for the body part. The manufacturer can use the data from the plurality of consumers to redesign or modify their designs, or create a new design, in order to provide consumers with a better fitting, mass-produced item such as the shoe. The consumer, based on the consumer's own biometric data, is matched with a better fitting, mass-produced item by the method based on a comparison of portions of the data of the mold, last, pattern or design from the manufacturers to portions of the biometric data of the consumer to determine a closest match. The closest matches of the products associated with the mold, last, pattern or design are recommended to the consumer.

This exchange of data incentivizes manufacturers to participate in the system and method in many ways. Participation allows the manufacturers to provide better fitting products than non-participating manufacturers. For example, in the footwear market, the fit of the shoe is based on many data points or dimensions gleaned from the provided consumer data representing a true, typical foot and the manufacturer's own shoe last data. Hence, a variety of shoes can be considered to meet the biometric data of the consumer to provide a better fit for multiple areas of the foot. This is in contrast to using the traditional Brannock Device of length, width and arch length or only having one brand to choose from. This leads to increased consumer satisfaction translating to fewer returns than non-participating manufacturers. Participating manufacturers may increase market share while non-participating manufacturers have a competitive disadvantage.

The consumer is incentivized in order to have a large degree of consumer participation. The greater the participation, the more biometric data on the true, typical foot can be provided to manufacturers. In this way, the manufacturers can use the biometric data to produce better fitting mass-produced shoes because the manufacturers can determine exactly what the true, typical foot looks like within particular segments and design or modify the product for a superior fit. This exchange of data incentivizes consumers to participate in the system and method in many ways. Participating consumers who shares their biometric data are recommended the best fitting available shoes based on their own data. This can eliminate the need to try on a variety of shoes to find the best fitting shoe because the system and method does the work for the consumer by removing the guess work. This reduces time and effort spent by the consumer, and reduces returns while taking advantage of the greater selection, the convenience, and better pricing.

The plurality of sources or manufacturers provide and keep up-to-date the several measurements (mold, last, pattern or design used to produce the item) of the article in every size of every model they sell. This may be according to Brannock size or another sizing paradigm. The plurality of consumers provide their individual biometric data of, for example, feet, to the platform. The platform processes the measurement data gained from the manufacturers and consumers and in exchange, the manufacturers designs a better fitting shoe and the consumer benefits from wearing the better fitting shoe.

Each manufacturer gains because the platform provides the manufacturer with the biometric, true, typical foot of consumers in the purchasing market. The manufacturer may segment the data by, for example, Brannock Device size (e.g., purchasers of women's 9B shoes), Brannock Device size and shoe type (e.g., purchasers of women's 9B running shoes), or Brannock Device size and model from the manufacturer (e.g., purchasers of Acme's women's 9B "Happy Trail" running shoes).

The biometric data from only one consumer tells the manufacturer very little, and does not give the manufacturer a rational basis to alter the paradigm of the design of the shoe last for the, e.g., typical woman's 9B running foot, and, hence, the woman's 9B running shoe. Instead, a vast data set from a plurality of consumers is needed in order to shift the shoe-design paradigm based on a new understanding of the true, typical foot. In order to gather data from a large plurality of consumers, incentives for the consumer to provide data are used.

The present embodiments accordingly create a multi-brand retail space in which consumers have incentives to share their biometric data. In exchange, the consumer gets better a fitting product. The consumers are incentivized to provide their biometric data to the platform because providing that data enables the platform to match the consumer with the best-fitting product which may consider fit, type, style, color, etc.

Retailors that sell shoes from different manufacturers do not have the measurements for every make, model and size of shoe they sell. Each manufacturer has up-to-date, accurate data for each model and size of shoe they manufacture so theoretically, in a limited, closed-loop system, consumers could be matched with the products from one particular manufacturer. However, this approach is only a single-manufacturer-based system involving only one specific manufacturer so the consumer cannot simultaneously compare shoes among different manufacturers. The closed-loop system of one specific manufacturer lacks the incentives for the consumers that an open, multi-brand retail space provides. For example, when only one brand is offered, consumers are limited to shop for shoes only one brand at a time and lack a way to compare relative fits in different brands. Such a system presents considerable inconvenience and complexity relative to using a system and method such as the disclosed that compares data for multiple manufacturers at a time wherein at least two manufacturers are different, separate, and unrelated business entities producing different brands of the product. The closed-loop system negatives dampens participation when compared to the two-sided data exchange market as disclosed herein which creates case of finding the truly best fitting shoes with a meaningful comparison among brands.

FIG. 1 is a simplified schematic of an example system 100, in accordance with some embodiments, with which users, such as a plurality of consumers 102 (also referred to as customers) and a plurality of sources 104, communicate using a variety of communication devices, such as personal computers, laptop computers, tablets, mobile phones, land-line phones, smartwatches, smart cars, or the like, operated by the user. The devices generally transmit and receive communications such as files, data and emails, through a variety of paths, communication access systems or networks 103. The networks 103 may be the Internet, a variety of carriers for telephone services, third-party communication service systems, third-party application cloud systems, third-party customer cloud systems, cloud-based broker service systems (e.g., to facilitate integration of different communication services), on-premises enterprise systems, or other potential data communication systems. In some embodiments, the system 100 includes an on-premises enterprise system which may be a computer, a group of computers, a server, a server farm or a cloud computing system.

In accordance with the description herein, the various components of the system 100 generally represent appropriate hardware and software components for providing the described resources and performing the described functions. The hardware generally includes any appropriate number and combination of computing devices, network communication devices, and peripheral components connected together, including various processors, computer memory (including transitory and non-transitory media), input/output devices, user interface devices, communication adapters, communication channels, etc. The software generally includes any appropriate number and combination of conventional and specially-developed software with computer-readable instructions stored by the computer memory in non-transitory computer-readable or machine-readable media and executed by the various processors to perform the functions described herein.

Figure 7:
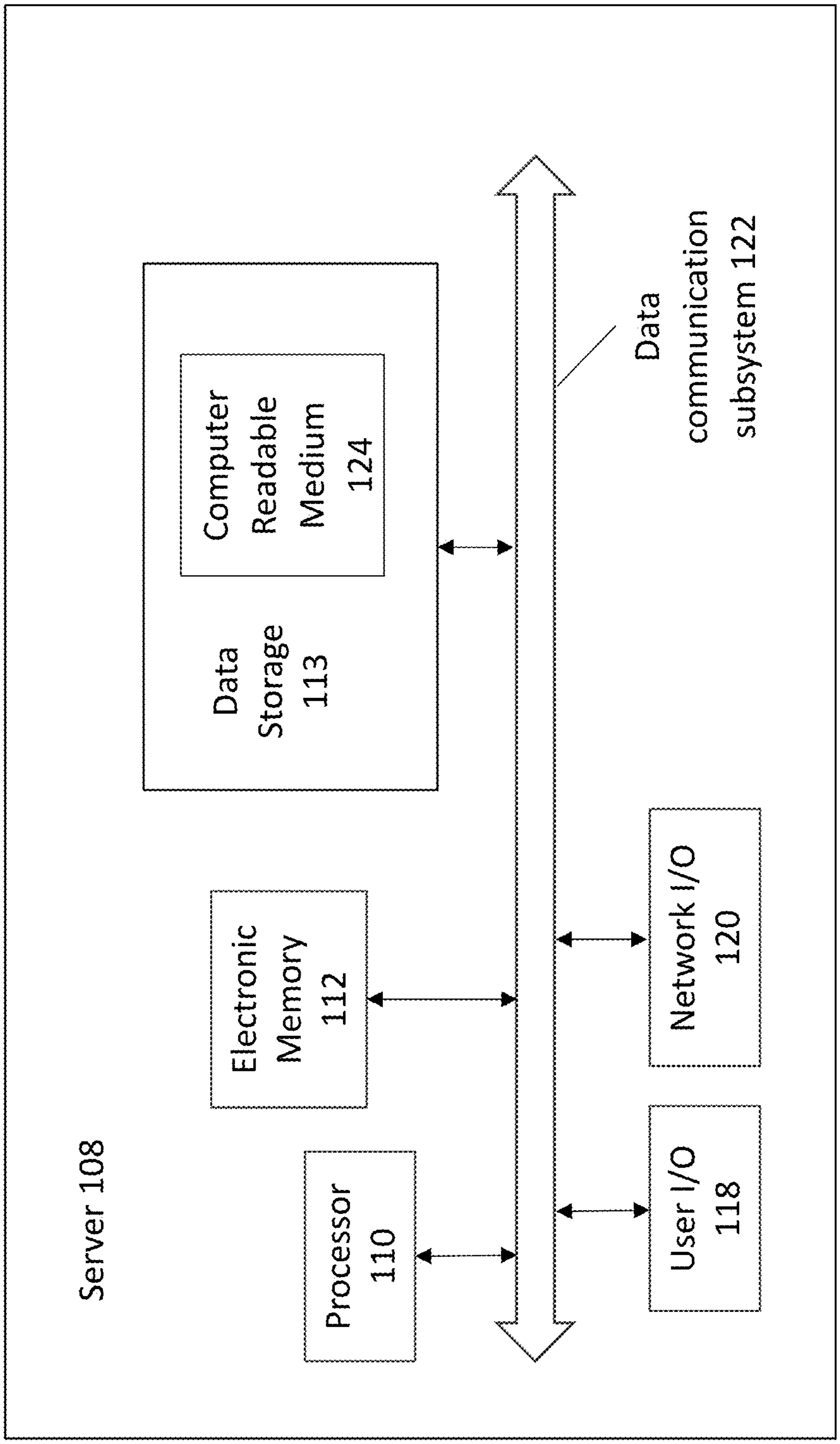
FIG. 7 is an example schematic of the server of FIG. 1, in accordance with some embodiments.

The system 100 includes a platform 106 with a server 108, processor 110 coupled to a memory 112, and data storage 113 (shown in FIG. 7). The memory 112 may store executable instructions. The data storage 113 may be implemented at least partially in a cloud network potentially with data in a database 114 synchronized across multiple geolocations. The server 108 may be referred to as one or more cloud servers. In some embodiments, the functions of the server 108 are enabled in a single computer device. In more complex implementations, some of the functions of the computing system are distributed across multiple computer devices, whether within a single server farm facility or multiple physical locations. In some embodiments, the server 108 functions as a single virtual machine. In some embodiments, at least a portion of the platform 106 may be an App running on a smartphone. The system 100 includes the plurality of consumers 102 such as consumer 102A, 102B, 102C . . . 102N representing any number of consumers. The system 100 includes the plurality of sources 104 such as source 104A, 104B, 104C . . . 104N representing any number of sources.

A first consumer 102A, a second consumer 102B, a third consumer 102C or an Nth consumer 102N, communicates with the system 100, and the system 100 communicates with the plurality of consumers 102. The consumer 102A (or consumer 102B, consumer 102C or Nth consumer 102N), also referred to as a user or customer, is interested in purchasing an item such as footwear. The first source 104A, a second source 104B, a third source 104C or a Nth source 104N, communicates with the system 100 and the system 100 communicates with the plurality of sources 104. The source 104A (or source 104B, source 104C or Nth source 104N) may be a shoe manufacturer, a shoe designer or a seller of shoes.

Figure 2:
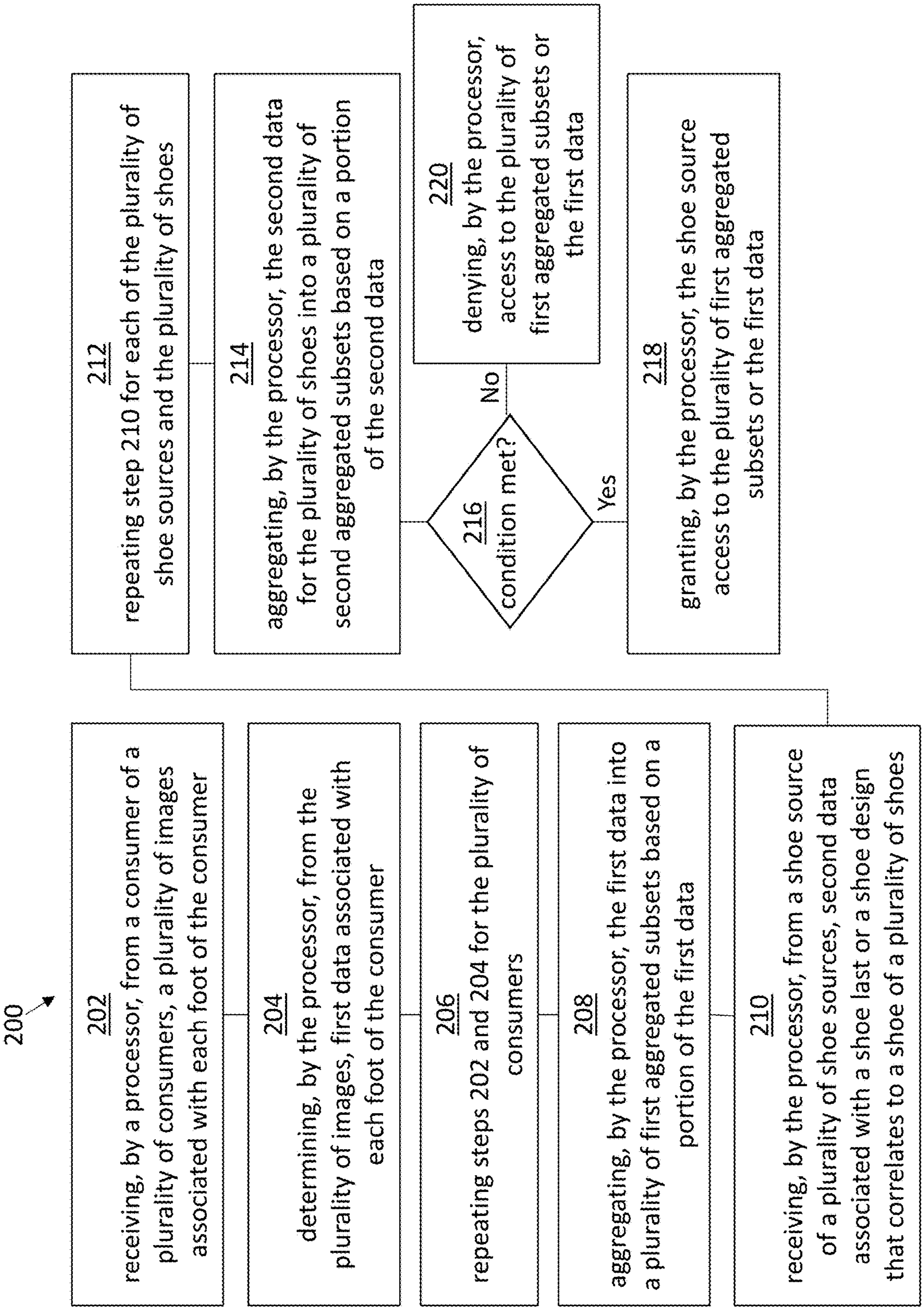
FIG. 2 is a simplified flowchart of a method, in accordance with some embodiments.

FIG. 2 is a simplified flowchart of a method 200, in accordance with some embodiments. At step 202, a processor 110 in the platform 106 of the system 100 receives a plurality of images associated with a body part such as each foot of the consumer 102A, from the device of consumer 102A of the plurality of consumers 102. In some embodiments, the processor 110 may also receive user or consumer 102A inputted data. This may be a consumer profile which includes characteristics about the consumer 102A such as gender, age, height, or weight. For example, the plurality of images may be captured with a camera on a mobile device such as a smartphone by the consumer 102A. This enables the consumer 102A to use a convenient, familiar process to take photographs of the body part—the feet—in the privacy of the home without needing to leave the home. In conventional systems, the consumer 102A may have to visit a store and use a dedicated machine or scanner to capture the images or the consumer 102A may have to obtain data such as by making a physical cast or mold of their feet. This may involve learning a complicated process, machine or scanner and may require the help of a second person. In some embodiments, other in-home devices may be used to capture the images of the feet such as a stand-alone camera, computer, television, scanner or the like.

The consumer profile and plurality of images are uploaded to the system 100, and converted to usable data. For example, the 2-dimensional images may be converted to a 3-dimensional model by the processor 110 using software techniques known in the art, or an algorithm may be used to transform the data. At step 204, the processor 110 determines, from the consumer profile and the plurality of images, first data associated with each foot of the consumer 102A. The first data may include a portion of the data based on a variety of characteristics. For example, for feet, the first data may include a foot length, ball girth, ball width, toe height, toc girth/circumference, toe width, heel width, heel height, heel curve height, percentage of ball girth, percentage of ball width, instep girth, arch width, instep height, arch depth, heel pitch, gender, age, height or weight. The first data is from the consumer profile and the plurality of images. The portion of the data is a subset of the first data any may include any number or combinations of the first data such as gender, foot length and ball width, or heel height, ball width and toe height, or instep girth, arch width, instep height, arch depth and heel pitch. The subsets are based on the consumer profile, the plurality of images, or a combination thereof.

At step 206, steps 202 and 204 are repeated for the plurality of consumers 102 so that the platform 106 obtains data from many consumers building the data in the database 114. The consumer profile and the plurality of images are stored in the database 114 and are associated with each of the consumers 102 such as 102A, 102B, 102C . . . 102N. This allows the platform 106 to have a variety of data about actual body parts—the feet—which is valuable to sources 104 such as shoe manufacturers and shoe designers. By using at least a portion of the consumer data (i.e., the first data of many consumers), shoe manufacturers and shoe designers can use the data to understand the true dimensions of the consumers 102 and produce better fitting shoes.

At step 208, the processor 110 aggregates the first data from the plurality of consumers 102 into a plurality of first aggregated subsets based on a portion of the first data. The aggregated subsets may be created in an unlimited number of ways, such as broad groups to a more granular level. The aggregated subsets may include a portion of the first data or combinations of the first data with other information. The other information may be with regard to consumers 102 such as consumer preferences (described hereafter) or consumer purchase history, or the other information may be with regard to sources 104 such as a specific source, style of shoe, or model of shoe. Examples may include women having the left foot length of 9.5 inches, women with a shoe size of 8B (based on measurements and according to the Brannock Device) who purchased a running shoe, or women with a shoe size of 8B who purchased a specific model running shoe in blue by a certain manufacturer. The aggregated subset may be a group with similarly sized feet or in a range, such that the group fits into a typical 8B shoe size.

To design a product such as a shoe, shoe manufacturers or designers use a shoe last. The shoe last is a solid form around which the shoe is molded and usually, many styles of shoes can may made from the same shoe last. Typically, the toe shape and heel height will be the same for each pair of shoes made from the same shoe last. The shoe last used in assembly can affect the overall fit of the shoe, so by modifying the shoe last, the fit of the shoe may be improved or perfected for each subset of consumers 102 having approximately the same set of characteristics in the first data. At step 210, the processor 110 receives second data associated with a shoe last or a shoe design that correlates to a shoe of a plurality of shoes from a first shoe source 104A of a plurality of shoe sources 104. This step may occur at any time in the method 200 such as before, after or simultaneously with step 202. For example, the source 104A may access the platform 106 and upload data of the shoe last for a particular shoe or array of shoes wherein the second data may include a brand, style, color, material, gender, length, ball girth, ball width, toe height, toe girth/circumference, toe width, heel width, heel height, heel curve height, heel pitch, percentage of ball girth, percentage of ball width, instep girth, arch width, instep height, arch depth, or heel pitch.

At step 212, step 210 is repeated for each of the plurality of shoe sources 104 and the plurality of shoes. This builds data in the database 114 of measurements or data of shoes (e.g., style, type, material, etc.) which are stored in the database 114 and associated with each of the sources 104 and each model of the shoes. This allows the platform 106 to have a variety of data about the actual shoes lasts (i.e., shoes) from the plurality of sources 104. For example, at least two shoe sources 104 are separate, unrelated business entities such as different brands or manufacturers. Accordingly, the database 114 contains data from the variety of sources, not just one source 104A. This is counterintuitive in the industry because sharing shoe last data may release proprietary information outside of the company. The plurality of shoe sources 104 do not have access to one another's data such as the second data.

In some embodiments, the uploaded shoe last data from the source 104A is transformed into a different format. For example, the processor 110 may construct a 3-dimensional model of the uploaded shoe last data using software techniques known in the art. This may be a virtual shoe last. In other embodiments, an algorithm may be used to transform the data. In some embodiments, if the data is not uploaded from the device of the source 104A, the actual product, for example, the shoe, may be physically or virtually measured to capture the data. The data is submitted to the database 114 and the data can then be transformed.

In some embodiments, the first data and the second data may vary based on the wearable item and can be customized to include data based on the body part. For example, when the method is applied to a shirt, the first data and the second data may include chest width, torso length, arm length, wrist circumference, neck circumference, shoulder width, bicep circumference, waist circumference, or shoulder width.

At step 214, the processor 110 aggregates the second data from the plurality of shoe sources 104 and for the plurality of shoes into a plurality of second aggregated subsets based on a portion of the second data. For example, the second aggregated subset may be broad groups or finer, more granular groups. The plurality of second aggregated subsets may include the portion of the second data, portions of the second data or combinations of the second data with other information. The other information may be with regard to consumers such as consumer preferences (described hereafter) or consumer purchase history, or the other information may be with regard to sources 104 such as a specific source, style of shoe, or model of shoe. Examples may include data from shoe lasts for women with a certain foot length, data from a shoe last for women that fits a foot size of 8B (per the Brannock Device) from a specific source or manufacturer, or data from a shoe last for women with a shoe size of 8B who purchased a particular model of shoe in a particular brand.

The processor 110 may receive a request from the shoe source 104A for access to the plurality of images, the first data associated with each foot of the consumer, the plurality of first aggregated subsets based on the portion of the first data, or any combination thereof. At step 216, the processor 110 checks if a condition has been met before granting access. For example, access may be granted only after the processor 110 receives the second data from the shoe source 104A of the plurality of shoe sources 104. In some embodiments, access may be granted when the source 104A is an authorized user. In other embodiments, access may be granted based on payment of a fee such as a subscription or a one-time fec.

At step 218, if the condition is met, the processor 110 grants the shoe source 104A access to the plurality of images, the first data associated with each foot of the consumer, the plurality of first aggregated subsets based on the portion of the first data or any combination thereof. In some embodiments, the granting of the access to the first aggregated subsets or the first data is contingent on receiving the shoe last or design data from the source 104A. In this way, if the shoe source 104A shares the shoe measurement data, the source 104A is rewarded by being privy to the measurements of actual feet for the plurality of consumers 102 as described in steps 202-208. In other embodiments, there may be limitations on what data the source 104A can view. For example, the processor 110 may grant access to the consumer data associated only with a particular source 104A, such as the source 104A can only obtain the consumer data for consumers 102 who purchased their products or provided a rating on a specific model of their products.

On the other hand, if the condition is not met, such as the shoe source 104A has not provided second data to the system 100, at step 220, the processor 110 denies the shoe source 104A access to the plurality of images, the first data associated with each foot of the consumer, the plurality of first aggregated subsets based on the portion of the first data, or any combination thereof.

In some scenarios, the first shoe source 104A may modify the shoe last or the shoe design based on a comparison between the plurality of first aggregated subsets and the plurality of second aggregated subsets. For example, the Acme brand shoe company may want to redesign the "Quest" model of the women's running shoe. The source 104A, Acme, after providing shoe last data, may access the first aggregated subset or the first data through the platform 106 based on key characteristics of the design to study the measurements of the plurality of actual consumers feet compared to the plurality of second aggregated subsets. Acme may then determine areas of the current shoe last or shoe design (in this case, Quest) to modify so that the finished product or the shoe built from the shoe last, is more accommodating to the actual biometric data from the plurality of consumers 102. In this example, the source 104A compares the first aggregated subset, which may be any combination of first data, with the plurality of second aggregated subsets, which may be any combination of second data then modifies the shoe last based on the comparison to provide a better fitting shoe for consumers 102.

In the industry, custom or bespoke shoes are made based on biometric data from one consumer. The present embodiments disclose making mass-produced custom shoes based on biometric data from the plurality of consumers 102. The source 104A has access to actual biometric data from the plurality of consumers 102 so the source 104A can design to actual biometric data from the plurality of consumers 102 instead of guessing how to design the shoe last. If the source 104A uses only the international standard Brannock Device to design the shoe last, only 2-dimensional data of length, width and arch length is used in the design. By using the actual biometric data from the plurality of consumers 102 from the plurality of images of their feet, the shoe last may be designed in fine detail using many other data points such as heel height, heel curve height, and percentage of ball girth, to name a few. Having more data points to incorporate in the shoe design can tailor the mass-produced shoe in a variety of foot-to-shoe areas which provides a better fit for the plurality of consumers 102—not only one consumer 102A.

As described, when the source 104A provides second data into the database 114, the source 104A can obtain the plurality of first aggregated subsets and the first data associated with each foot of typical consumers 102. The first data may be used by the source 104A to create a new shoe last or a new shoe design based on the plurality of first aggregated subsets or the first data. In this way, a better fitting shoe can be designed based on actual customer data. For example, it may be recognized that in a particular first aggregated subset, consumers 102 conventionally wear a men's size 10 according to the Brannock scale. In this data, for example, the heal width dimension with relation to the heal height can be studied so that a new shoe is designed with a more precise amount of space for comfort.

Figure 3:
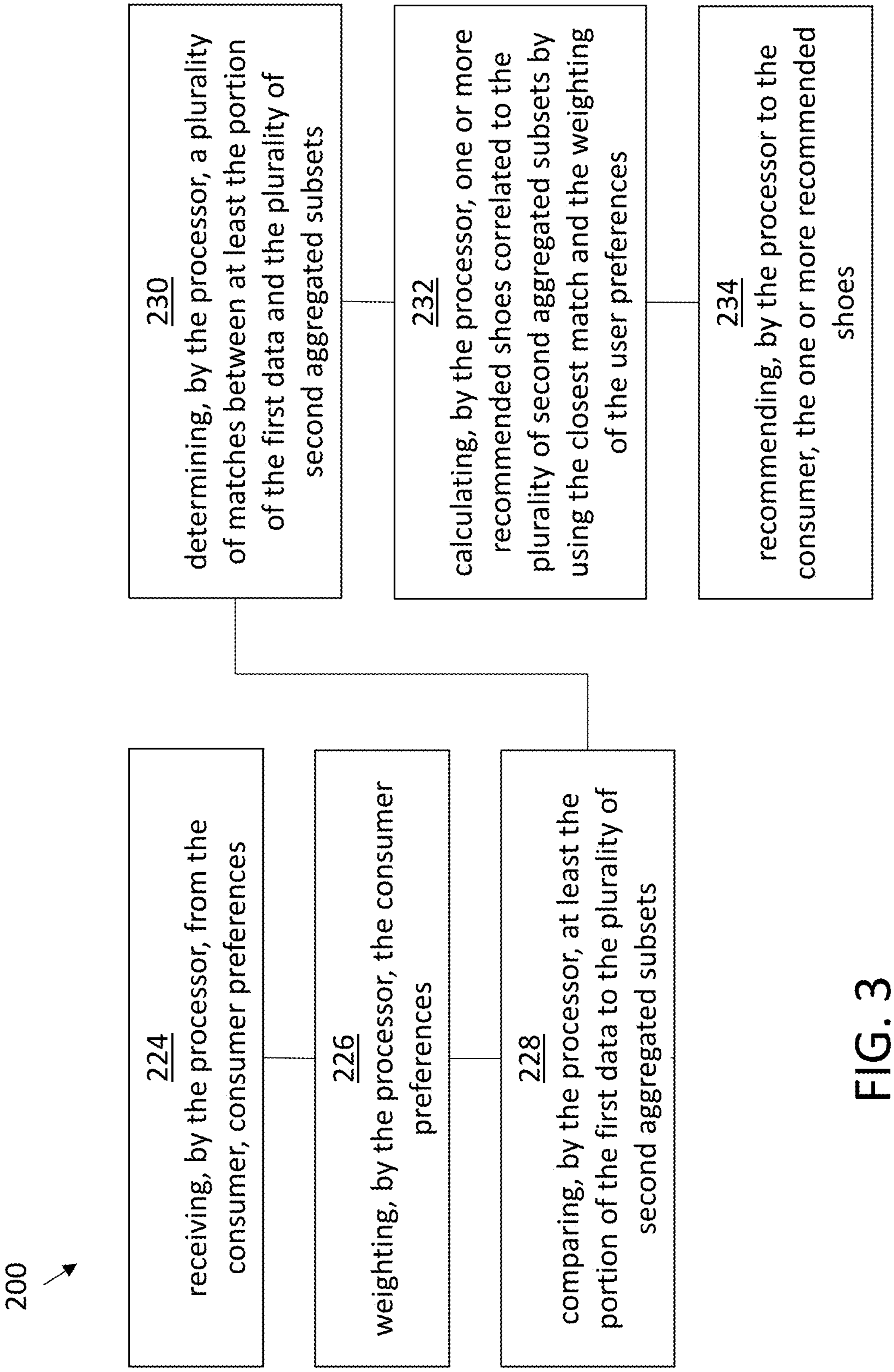
FIG. 3 is a simplified flowchart of further steps for the method, in accordance with some embodiments.

The method 200 may include further steps. FIG. 3 is a simplified flowchart of further steps for the method 200, in accordance with some embodiments. At step 224, the processor 110 receives consumer preferences from the device of the consumer 102A. The consumer preferences may include shoe use, shoe style, desired colors, desired brand or personal comfort preferences. For example, the consumer 102A may be shopping for a women's running shoe, size 8B that has a wider toe box with a higher arch. The desired shoe characteristics of the wider toe box with a higher arch may be designated as consumer preferences. At step 226, the processor 110 weights the consumer preferences. The weighting may be based on consumer input, an algorithm, or a combination thereof. In other embodiments, the processor 110 receives consumer preferences from the device of the consumer 102A of the plurality of consumers 102. This may be repeated for the plurality of consumers 102. The plurality of consumer preferences are aggregated into a plurality of third aggregated subsets based on a portion of the consumer preferences. In this way, the plurality of third aggregated subsets may be used by the processor 110 when making, for example, shoe recommendations to the consumer 102A or the plurality of consumers 102.

At step 228, the processor 110 compares at least the portion of the first data to the plurality of second aggregated subsets, and at step 230, the processor 110 determines a plurality of matches between at least the portion of the first data and the plurality of second aggregated subsets. Continuing with the example, the processor 110 compares and determines matches between the data (e.g., measurements) from the uploaded images of the feet for that consumer 102A and the data (e.g., measurements) of the shoe last or shoe design from the plurality of sources 104. Potential shoes from the plurality of shoes are identified considering many different brands or sources 104 that will fit that specific consumer 102A. The data is based on many data points or dimensions as described by the first data and the second data as opposed to only a few x-y data points when using the Brannock Device. Having more measurements to compare narrows the possibilities of shoes and thus provides a better fitting shoe for multiple areas of the foot/shoe which leads to overall consumer satisfaction. Having multiple brands to choose from also provides a better fitting shoe as opposed to only having one brand to choose from which may be known in the art to have a narrow toe box, have zero-drop, or run larger than advertised.

At step 232, the processor 110 calculates one or more recommended shoes correlated to the plurality of second aggregated subsets by using the closest match, and may further use the weighting of the user preferences to narrow the matches. Continuing with the example, some shoes that are calculated to be recommended may be eliminated based on the width of the toe box since the consumer 102A prefers a larger toe box (as defined in consumer preferences). Accordingly, the weighting of the user preferences such as the dimension of the toe box and arch height of the recommended shoes may be considered, and those with a smaller width in the range of the recommended shoes may be dropped so only the shoes with a larger width toe box are recommended to the consumer.

Figure 4:
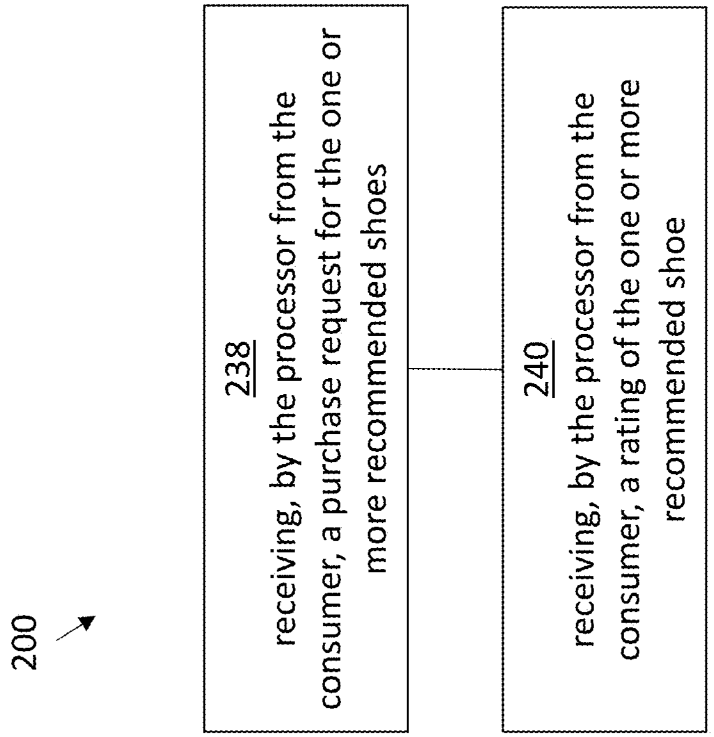
FIG. 4 is a simplified flowchart of further steps for the method, in accordance with some embodiments.

At step 234, the processor 110 recommends to the device of the consumer 102A, the one or more recommended shoes. The recommended shoes represent the best fitting shoe for the particular consumer 102A based on the data of the consumer 102A from the uploaded images of their feet and the user preferences compared to data from shoe lasts provided by the plurality of sources 104. The system 100 may enable the consumer 102A to purchase the one or more recommended shoes within the system 100. FIG. 4 is a simplified flowchart of further steps for the method 200, in accordance with some embodiments. In some embodiments, the processor 110 may correlate the plurality of first aggregated subsets with the plurality of second aggregated subsets based on the shoe of the plurality of shoes. The shoe may be associated with a purchase request from the device of the consumer 102A associated with the consumer 102A. At step 238, the processor 110 receives from the device of the consumer 102A, the purchase request for the one or more recommended shoes. In some embodiments, the platform 106 or a third party may fill the purchase request.

At step 240, the processor 110 receives from the device of the consumer 102A a rating of the one or more recommended or purchased shoe. In this way, the system 100 may provide feedback to the plurality of consumers 102 and the plurality of sources 104 regarding the purchased shoe. For example, after the processor 110 recommends one or more shoes to the consumer 102A, and an amount of time has passed in which the consumer 102A presumably wears one of the recommended shoes, the processor 110 receives the opinion of consumer 102A of the recommend shoe from the device of the consumer 102A. This may be a rating on a scale such as 1 to 10 or comments regarding the fit and performance of the recommended shoe. In some embodiments, the consumer rating of the shoe, alone or in combination with other factors, may be used by the source 104A associated with that particular shoe to modify the shoe last or shoe design. For example, the shoe source 104A of the plurality of shoe sources 104 may modify the shoe last or the shoe design based on a comparison between the plurality of first aggregated subsets and the plurality of second aggregated subsets, or the ratings from consumers 102 who wore the shoe, or a combination thereof. In some scenarios, the shoe source 104A may be interested in modifying the shoe last or design based on both positive and negative feedback from the plurality of consumers 102 for a particular shoe.

Figure 5:
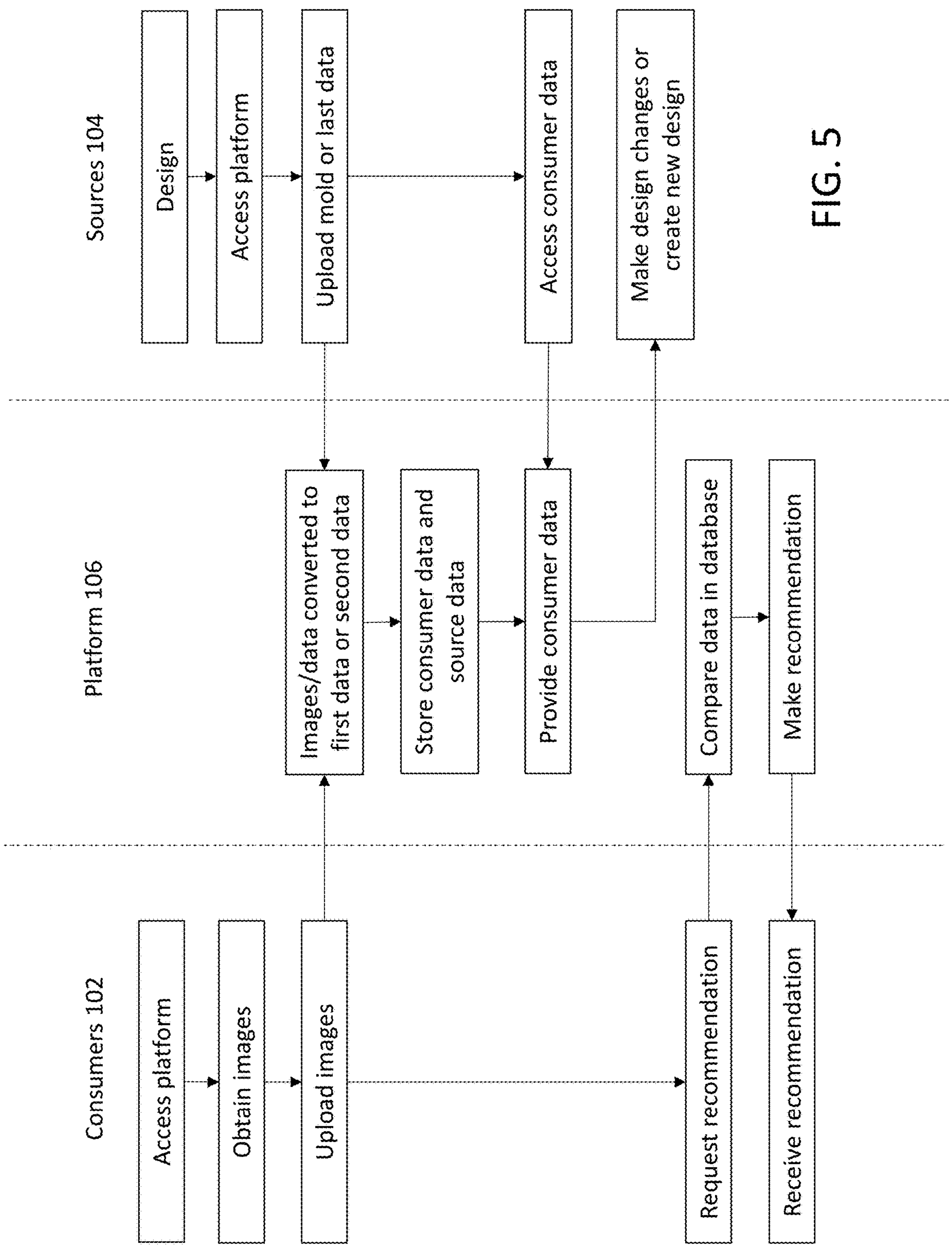
FIG. 5 is a simplified flowchart representing inputs by consumers, the platform and sources for the method, in accordance with some embodiments.

FIG. 5 is a simplified flowchart representing inputs by consumers 102, the platform 106, and the sources 104 for the method 200, in accordance with some embodiments. With reference to FIGS. 2 and 3, the consumer 102A accesses the platform 106 via a device, obtains images of their body part such as the feet, and uploads the images along with the consumer profile. The platform 106 converts the consumer profile and images to the first data associated with the consumer 102A or the second data associated with the source 104A and stores the data. The source 104A designs products such as shoes, accesses the platform 106, and uploads mold or last data. The source 104A may access the first data and based on this first data, the source 104A can make changes to an existing shoe last or design, or create a new design. The consumer 102A can request the platform 106 to provide a recommendation for the best fitting shoes based on the data (e.g., uploaded images, consumer preferences, and other information) of the consumer 102A. The platform 106 may compare and correlate first data associated with the consumer 102A and the second data associated with sources 104 and make a recommendation to the consumer of a plurality of closest matches. The device of the consumer 102A receives the recommendation.

Figure 6:
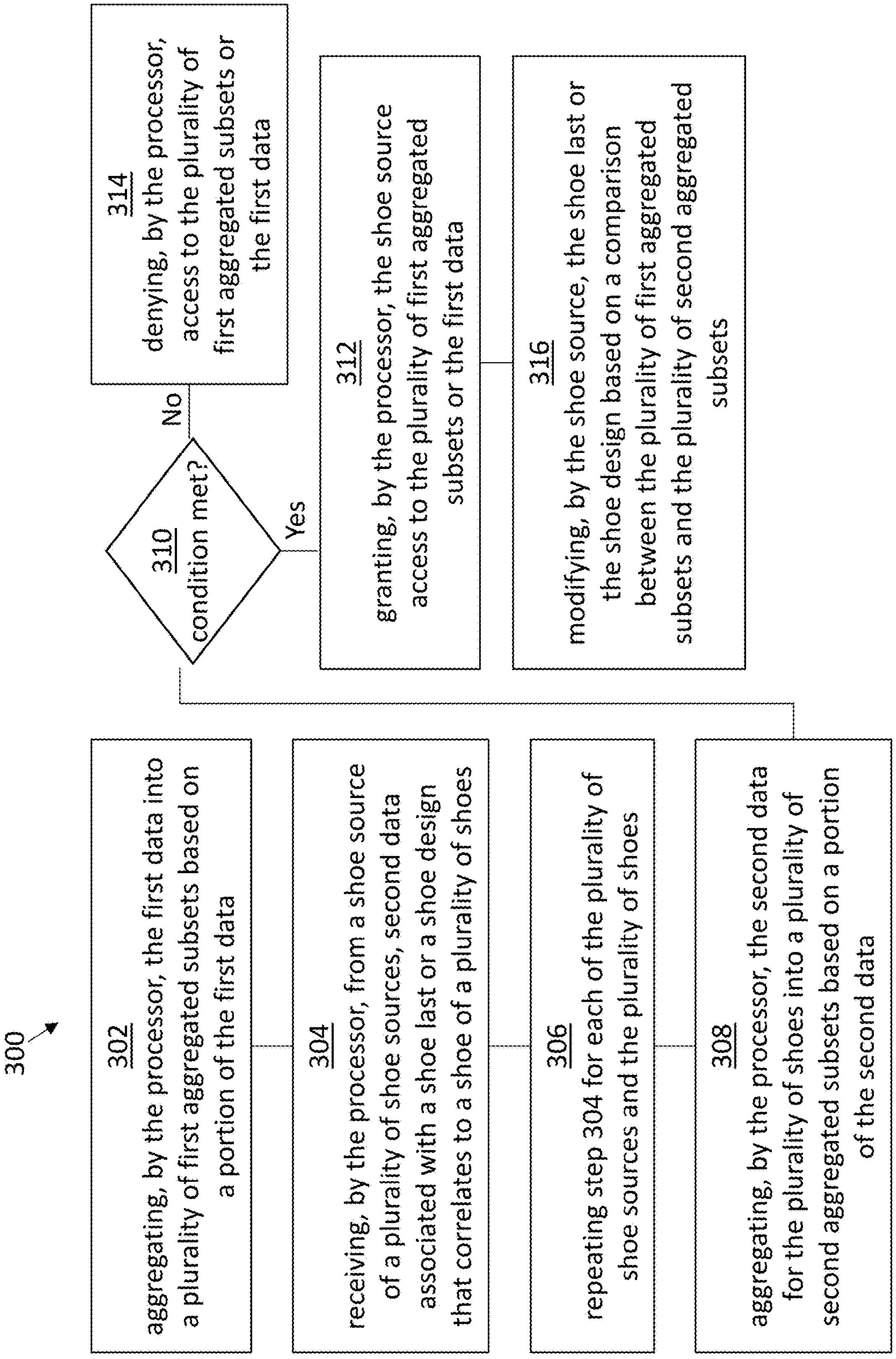
FIG. 6 is a simplified flowchart of a method, in accordance with some embodiments.

FIG. 6 is a simplified flowchart of a method 300, in accordance with some embodiments. At step 302, the processor 110 aggregates first data into a plurality of first aggregated subsets based on a portion of the first data received from the plurality of consumers 102. As described herein, the first aggregated subsets may be created in an unlimited number of ways and may include a portion of the first data, portions of the first data or combinations of the first data with other information. The first data includes a foot length, ball girth, ball width, toc height, toe girth/circumference, toe width, heel width, heel height, heel curve height, percentage of ball girth, percentage of ball width, instep girth, arch width, instep height, arch depth, heel pitch, gender, age, height or weight. The other information may be consumer preferences, consumer purchase history, a specific source, style of shoe, or model of shoe.

At step 304, the processor 110 receives second data associated with a shoe last or a shoe design that correlates to a shoe of a plurality of shoes. This step may occur at any time in the method 300 such as before, after or simultaneously with step 302. The second data may include a brand, style, color, material, gender, length, ball girth, ball width, toe height, toc girth/circumference, toe width, heel width, heel height, heel curve height, heel pitch, percentage of ball girth, percentage of ball width, instep girth, arch width, instep height, arch depth or heel pitch.

At step 306, step 304 is repeated for each of the plurality of shoe sources 104 and each of the plurality of shoes. This contributes to the database 114 of measurements or data of shoes which are stored in the database 114 and associated with each of the sources 104 and each model of the shoes. At least two shoe sources 104 are separate, unrelated business entities such as different brands or manufacturers. At step 308, the processor 110 aggregates the second data from the plurality of shoe sources 104 and for the plurality of shoes into a plurality of second aggregated subsets based on a portion of the second data. The plurality of second aggregated subsets may include the portion of the second data, portions of the second data or combinations of the second data with other information.

The processor 110 may receive a request from the shoe source 104A for access to the plurality of images, the first data associated with the consumer, the plurality of first aggregated subsets based on the portion of the first data or any combination thereof. At step 310, the processor 110 checks if a condition has been met before granting access. For example, access may be granted only after the processor 110 receives the second data from the shoe source 104A, when the source 104A is an authorized user, or upon payment of a fec.

At step 312, the processor 110 grants the shoe source 104A access to the plurality of first aggregated subsets or the first data. In some embodiments, access may be only after the processor 110 receives the second data from the shoe source 104A of the plurality of shoe sources 104. At step 314, if the condition is not met, the processor 110 denies the shoe source 104A access to the plurality of images, the first data associated with the consumer, the plurality of first aggregated subsets based on the portion of the first data or any combination thereof.

At step 316, the shoe source 104A may modify the shoe last or the shoe design of a mass-produced shoe based on a comparison between the plurality of first aggregated subsets and the plurality of second aggregated subsets. In other embodiments, the shoe source 104A may modify the shoe last or the shoe design based on the first aggregated subsets, the first data, the correlation between the first data and the second data, a rating of the shoe of the plurality of shoes by the consumer, a weighting factor, consumer preferences or any combination thereof. In some embodiments, the first data may be used by the source 104A to create a new shoe last or a new shoe design for a mass-produced shoe based on the plurality of first aggregated subsets, or the first data that the source 104A has access to, from the platform 106.

In some embodiments, when the processor 110 receives second data from the shoe source 104A, the processor 110 grants access to the shoe source 104A the plurality of first aggregated subsets or the first data. When the processor 110 receives first data from the consumer 102A, the shoe last or the shoe design is modified based on a comparison between the plurality of first aggregated subsets and the plurality of second aggregated subsets, creating a two-sided market.

In some embodiments, the 3-dimensional image of the foot of the consumer 102A may be used by the consumer 102A to virtually "try on" the plurality of shoes within the system. In further embodiments, a virtual shoe last may be made from the plurality of images per consumer 102A and used by the consumer 102A to virtually "try on" the plurality of shoes within the system 100 or to compare their virtual shoe last based on their foot to other shoe lasts within the system 100. In yet further embodiments, the virtual shoe lasts of the plurality of consumers 102 or the plurality of sources 104 may be printed using a 3-dimensional printer or similar technology.

In some embodiments, the virtual shoe last of the consumer 102A, based on the plurality of images of the body part, may be represented by a multidigit number or scan code. This code may be used to shop within the system 100 or at participating brick-and-mortar retailers. For example, the consumer 102A may visit the participating brick-and-mortar retailer and the multidigit number or scan code representing the consumer biometric measurements may be used to match the consumer 102A to products based in real-time with in-store inventory or products the store may order.

A new sizing paradigm may be created within the system 100 where a consumer 102A knows a variety of measurements of their feet—as opposed to the current system of only length, width and arch length—and have the ability to purchase shoes knowing more data points regarding the fit. The new sizing scale or chart may be the multidigit number representing a portion of the first data. This enables the consumer 102A to shop for specific factors for fit instead of by generic sizes, and eliminates the frustration by the consumer 102A due to inconsistency in generic sizing between brands or within brands. With better fitting shoes, customer satisfaction is increased and thus the number of returned shoes is reduced saving money and time in shipping and other return-related factors. Online retailers benefit from the new sizing paradigm and may have market power to require the plurality of sources 104 to provide the data for the molds, lasts, patterns or designs to the platform 106.

By using the system 100 and methods 200 and 300, the consumer 102A can have a mass-produced custom shoe without the inconveniences, cost or time of a true custom or bespoke shoe. For example, the consumer 102A may be located anywhere and hence, does not need to travel to obtain the plurality of images at a specific store. This expands the market as a function of eliminating geographical limitations and the inconvenience of repeated adjustments and fittings for custom or bespoke shoes. Consequently, there is no need for the craftsperson/designer of a custom shoe to meet repeatedly with the consumer 102A or to do the actual work, so the cost of producing the virtual shoe last is significantly lower than producing a physical last. The role of the consumers 102 in acquiring the plurality of images as a familiar and convenient process, such as by using a smartphone, is desirable as opposed to making a cast of each foot at home and shipping it to the manufacturer.

FIG. 7 is an example schematic of the server 108 of FIG. 1, in accordance with some embodiments. FIG. 7 shows an embodiment of the server 108 (representing any combination of one or more of the servers) for use in the system 100 and methods 200 and 300, in accordance with some embodiments. Other embodiments may use other components and combinations of components. For example, the server 108 may represent one or more physical computer devices or servers, such as web servers, rack-mounted computers, network storage devices, desktop computers, laptop/notebook computers, etc. In some embodiments, the system 100 and methods 200 and 300 are implemented at least partially in a cloud network potentially with data synchronized across multiple geolocations, and the server 108 may be referred to as one or more cloud servers. In some embodiments, the functions of the server 108 are enabled in a single computer device. In more complex implementations, some of the functions of the computing system are distributed across multiple computer devices, whether within a single server farm facility or multiple physical locations. In some embodiments, the server 108 functions as a single virtual machine.

In the illustrated embodiment, the server 108 generally includes at least one processor 110, a main electronic memory 112, a data storage 113, a user input/output (I/O) 118, and a network I/O 120, among other components not shown for simplicity, connected or coupled together by a data communication subsystem 122. A non-transitory computer readable medium 124 includes instructions that, when executed by the processor 110, cause the processor 110 to perform operations including receiving inputs, determining data, aggregating data, allowing access to data, weighting data, comparing data, determining matches, calculating data, and providing recommendations as described herein.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:

receiving, by a processor, from a consumer device, consumer first data;

receiving, by the processor, from a plurality of wearable item source devices respectively operated by at least two separate, unrelated business entities, second data associated with a wearable item mold or a wearable item design that correlates to a wearable item of a plurality of wearable items;

determining, by the processor, a plurality of matches by comparing a first virtual three-dimensional (3D) model associated with the consumer first data to a second virtual 3D model associated with the second data;

recommending, by the processor to the consumer device, the plurality of matches;

controlling, by the processor, access to the consumer first data based upon receipt of the second data from a wearable item source device of the plurality of wearable item source devices; and granting, by the processor, the wearable item source device access to the consumer first data only after the receipt of the second data from the wearable item source device;

wherein, after the granting, the wearable item source device of the plurality of wearable item source devices associated with a wearable item source modifies a solid form of the wearable item mold in an assembly process, based on the consumer first data made available by the granting.

2. The method of claim 1, wherein the consumer first data is a consumer profile and consumer biometric information.

3. The method of claim 1, wherein the consumer first data includes measurements of a body part associated with the wearable item, gender, age, height, weight or combinations thereof.

4. The method of claim 1, wherein the second data includes a brand, style, color, material, gender, measurements of the wearable item associated with a body part, or combinations thereof.

5. The method of claim 1, further comprising:

generating, by the processor, the first virtual 3D model based on the consumer first data; and generating, by the processor, the second virtual 3D model based on the second data.

6. The method of claim 1, further comprising:

receiving, by the processor from the consumer device, consumer feedback associated with the wearable item.

7. The method of claim 6, wherein the consumer feedback includes both a positive rating and a negative rating, a rating on a scale of 1 to 10, a consumer's opinion associated with the wearable item, or a comment regarding a fit or a performance associated with the wearable item.

8. The method of claim 6, further comprising:

granting, by the processor, the wearable item source device access to the consumer feedback associated with the wearable item.

9. The method of claim 1, wherein the granting access to the consumer first data further requires at least one of:

authorizing the wearable item source device by the processor; or receiving, by the processor, payment of a fee.

10. The method of claim 1, wherein:

the wearable item source comprises a manufacturer, a designer, or a seller of the wearable item.

11. A method comprising:

recommending, by a processor to a consumer device, a plurality of matches determined by comparing a first virtual three-dimensional (3D) model associated with consumer first data received from the consumer device to a second virtual 3D model associated with second data received from a plurality of wearable item source devices;

controlling, by the processor, access to the consumer first data based upon receipt of the second data from a wearable item source device of the plurality of wearable item source devices; and granting, by the processor, the wearable item source device access to the consumer first data only after the receipt of the second data from the wearable item source device;

wherein, after the granting, the wearable item source device of the plurality of wearable item source devices associated with a wearable item source modifies a solid form of a wearable item mold in an assembly process, based on the consumer first data made available by the granting.

12. The method of claim 11, wherein the second data is associated with the wearable item mold or a wearable item design that correlates to a wearable item of a plurality of wearable items.

13. The method of claim 11, wherein the consumer first data is a consumer profile and consumer biometric information.

14. The method of claim 11, wherein the consumer first data includes measurements of a body part associated with a wearable item, gender, age, height, weight or combinations thereof.

15. The method of claim 11, wherein the second data includes a brand, style, color, material, gender, measurements of a wearable item associated with a body part, or combinations thereof.

16. The method of claim 11, further comprising:

generating, by the processor, the first virtual 3D model based on the consumer first data; and generating, by the processor, the second virtual 3D model based on the second data.

17. The method of claim 11, further comprising:

receiving, by the processor, from the consumer device, consumer feedback associated with a wearable item from the wearable item source, wherein the consumer feedback includes both a positive rating and a negative rating, a rating on a scale of 1 to 10, a consumer's opinion associated with the wearable item, or a comment regarding a fit or a performance associated with the wearable item.

18. The method of claim 17, further comprising:

granting, by the processor, the wearable item source device access to the consumer feedback associated with the wearable item.

19. The method of claim 11, wherein the granting access to the consumer first data further requires at least one of:

authorizing the wearable item source device by the processor; or receiving, by the processor, payment of a fee.

20. The method of claim 11, wherein:

the wearable item source comprises a manufacturer, a designer, or a seller of a wearable item.

* * * * *